(12) United States Patent
Akedo et al.

(10) Patent No.: US 7,394,583 B2
(45) Date of Patent: Jul. 1, 2008

(54) LIGHT-BEAM SCANNING DEVICE

(75) Inventors: Jun Akedo, Tsukuba (JP); Lebedev Maxim, Tsukuba (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 181 days.

(21) Appl. No.: 11/258,103

(22) Filed: Oct. 26, 2005

(65) Prior Publication Data

US 2006/0245023 A1  Nov. 2, 2006

(30) Foreign Application Priority Data

Apr. 13, 2005   (JP) ............................. 2005-115352

(51) Int. Cl.
*G02B 26/08* (2006.01)
*G06K 7/10* (2006.01)

(52) U.S. Cl. .................................. 359/223; 235/462.01

(58) Field of Classification Search ................ 359/223, 359/213, 212, 221–226, 872, 224, 290, 291; 250/216, 306, 307, 234, 235; 235/462.01
See application file for complete search history.

(56) References Cited

U.S. PATENT DOCUMENTS

| | | | |
|---|---|---|---|
| 5,828,051 A | 10/1998 | Goto | 235/472.01 |
| 6,198,565 B1 * | 3/2001 | Iseki et al. | 359/224 |
| 6,676,020 B2 | 1/2004 | Grant et al. | 235/462.45 |
| 6,989,919 B2 | 1/2006 | Yasui | 359/224 |
| 7,146,067 B2 * | 12/2006 | Despont et al. | 385/16 |
| 7,161,275 B2 | 1/2007 | Yoda | 359/224 |

* cited by examiner

*Primary Examiner*—Ricky L Mack
*Assistant Examiner*—Tuyen Q Tra
(74) *Attorney, Agent, or Firm*—Sughrue Mion, PLLC

(57) ABSTRACT

A light-beam scanning device includes a base plate having a torsion beam portion formed therein, and a mirror portion supported by the torsion beam portion and adapted to be oscillated. The light-beam scanning device includes one of a piezoelectric member, a magnetostrictive member and a permanent magnet member, which is fixed to or formed as a portion of the base plate. The mirror portion supported by the torsion beam portion is oscillated by a plate wave that is induced in the base plate by applying a voltage or electric field to the piezoelectric, magnetostrictive or permanent magnet member. The light-beam scanning device can efficiently generate a torsional oscillation in the mirror portion in a simplified structure.

20 Claims, 14 Drawing Sheets

A: applied voltage: constant

B: applied electric field: constant

Thickness of base plate (SUS 340): 50 μm

"zero" position Laser beam scanning at 23.6 kHz

Mirror size 1mmx0.3 mm
Incident laser beam Ø3mm

LIGHT-BEAM SCANNING DEVICE

This application claims foreign priority under 35 USC §119 based on Japanese Patent Application No. 2005-115352, filed on Apr. 13, 2005, the contents of which is incorporated herein by reference in its entirety. This foreign priority claim is being made concurrently with the filing of this application.

TECHNICAL FIELD

The present invention relates to a light beam scanner for scanningly deflecting a light beam, and more particularly to a light-beam scanning device designed to rotationally oscillate a micromirror supported by a torsion beam (torsion bar) so as to deflect a light beam.

BACKGROUND ART

In the related art, a light beam scanner for scanningly deflecting a light beam, such as a laser beam, is used in various optical apparatuses, such as barcode readers, laser printers and head-mounted displays, or as a light pickup element of an optical input device for infrared cameras or the like. In connection with this type of light beam scanner, there has been proposed a light beam scanner designed to rotationally oscillate a micromirror prepared using silicon micromachining techniques.

For example, FIG. 14 shows a light beam scanner having a silicon micromirror which is disclosed in Japanese Patent Laid-Open Publication No. 11-52278 (hereafter "JP '278"). This light beam scanner is fabricated using silicon micromachining techniques, so as to have the total area on the order of several millimeters square. A support substrate 1 is formed of a rectangular thick plate. The support substrate 1 has a central region formed as a concave portion 1a, and a mirror 2 formed of a silicon thin film and supported by the support substrate 1 so as to be located inside the concave portion 1a. This mirror 2 is integrally formed with two torsion bars 3a, 3b protruding, respectively, from two opposite edges thereof The distal ends of the torsion bars 3a, 3b are each fixed to the support substrate 1, and two pads 4a, 4b are electrically connected, respectively, to the distal ends of the torsion bars 3a, 3b. This structure allows the mirror 2 to be rotationally oscillated in a direction perpendicular to an in-plane direction of the mirror 2 in conjunction with a torsional deformation of the torsion bars 3a, 3b. At least a peripheral region or a surface of the mirror 2 is subjected to impurity ion-implantation or diffusion, or coated with an aluminum or silver film or an organic thin film having electrical conductivity. This peripheral region serves as an electrode portion 5 having electrical conductivity.

Further, two fixed electrodes 7a, 7b are disposed on a top surface of the support substrate 1 through an insulator 6, respectively, on opposite sides of the concave portion 1a. These fixed electrodes 7a, 7b are made of a conductive material consisting of a semiconductor or organic material. Each inner edge of the fixed electrodes 7a, 7b is disposed close to the electrode portion 5 at a corresponding one of opposite lateral edges of the mirror 2, so that a capacitor is formed between the electrode portion 5 and each of the fixed electrodes 7a, 7b.

When a prescribed voltage is applied between a pad 8a of the fixed electrode 7a and each of the pads 4a, 4b of the torsion bars 3a, 3b, the prescribed voltage is also applied to the electrode portion 5 of the mirror 2 connected to the pads 4a, 4b, to allow electric charges to be stored in the surface of the fixed electrode 7a and the surface of the electrode portion 5 of the mirror 2 in opposite polarities, so as to form a capacitor therebetween. Thus, an electrostatic attraction acts between the fixed electrode 7a and the electrode portion 5 of the mirror 2 to induce rotation of the mirror 2. Subsequently, when the mirror 2 is returned to its original position, a prescribed voltage is applied between the fixed electrode 7b and the electrode portion 5 of the mirror 2 to rotate the mirror 2 in the opposite direction. The above operation is repeated to allow the mirror 2 to perform a rotationally oscillating movement in which the mirror 2 is rotated up to respective maximum counterclockwise and clockwise rotational positions repeatedly and alternately.

There is also a related art light beam scanner for rotationally oscillating a micromirror fabricated using silicon micromachining techniques as disclosed in Japanese Patent Laid-Open Publication No. 10-197819 (hereafter "JP '819"). As shown in FIG. 15, this light beam scanner comprises a plate-shaped micromirror 1 for reflecting light, a pair of rotating support members 2 aligned in a straight line to support opposite edges of the micromirror 1, a frame 3 surrounding the periphery of the micromirror 1, and a piezoelectric element 4 for producing a translational movement of the frame 3. The center of gravity of the micromirror 1 is located at a position deviated from the straight line connecting the pair of rotating support members 2.

The piezoelectric element 4 elongates and shrinks, or vibrates, in a Z-axis direction, in response to a prescribed voltage applied thereto. This vibration is transmitted to the frame 3. Thus, the micromirror 1 has a relative movement with respect to the driven frame 3. Specifically, when a Z-axis directional vibration component is transmitted to the micromirror 1, a rotational moment is produced in the micromirror 1 around the rotating support members 2 on an X-axis, because the micromirror 1 has mass components laterally asymmetric relative to an axial line defined by the rotating support members 2 on the X-axis. In this way, the translational movement of the frame 3 produced by the piezoelectric element 4 is converted to a rotational movement of the micromirror 1 around the rotating support members 2 on the X-axis.

The light beam scanner in JP '278 is fabricated using silicon micromachining techniques to have a total area on the order of several millimeters square. Moreover, it is required to have the electrode portion 5 formed in at least a peripheral region or a surface of the mirror 2, the pads 4a, 4b connected to the torsion bars 3a, 3b, the fixed electrodes 7a, 7b disposed, respective, on opposite lateral sides of the top surface of the support substrate 1 through the insulator 6, and the pads 8a, 8b connected to the fixed electrodes 7a, 7b.

The requirement of having the electrode portion 5 formed in at least a peripheral region or a surface of the mirror 2, the pads 4a, 4b connected to the torsion bars 3a, 3b, the fixed electrodes 7a, 7b disposed, respective, on opposite lateral sides of the top surface of the support substrate 1 through the insulator 6, and the pads 8a, 8b connected to the fixed electrodes 7a, 7b, causes structural complexity, and increases in factor causing failures, lost manufacturing time and increased cost.

The light beam scanner in the JP '819 is designed to convert the translational movement of the frame 3 produced by the piezoelectric element 4 to the rotational movement of the micromirror 1 around the rotating support members 2 on the X-axis. Thus, the center-of-gravity position of the micromirror 1 must be deviated relative to the axial line defined with respect to the rotating support members 2. Moreover, a thickness of this light beam scanner is inevitably increased in not only the X-Y directions but also the Z-axis direction, which causes difficulties in achieving a thin structure.

SUMMARY

It is an object of the present invention to provide a light-beam scanning device designed to place one of a piezoelectric member, a magnetostrictive member and a permanent magnet member on a base plate having a torsion beam portion supporting a mirror portion, and produce a torsional oscillation in the mirror portion by a plate wave of the base plate, so as to generate the torsional oscillation in the mirror portion efficiently in a simplified structure. However, the present invention is not limited to the foregoing object, nor is the foregoing object required to practice the embodiments. Further, other object or no objects at all may be achieved without departing from the scope of the invention.

The present invention can be summarized as follows.

(1) A light-beam scanning device includes a base plate which has a torsion beam portion formed therein and a mirror portion supported by the torsion beam portion and adapted to be oscillated. The light-beam scanning device comprises a vibration source member selected from the group consisting of a piezoelectric member, a magnetostrictive member and a permanent magnet member. The vibration source member is fixed to or formed as a portion of the base plate. In the light-beam scanning device, the mirror portion supported by the torsion beam portion is oscillated by means of a plate wave to be induced in the base plate by applying a voltage or electric field to the vibration source member.

(2) In the light-beam scanning device set forth in the above (1), the vibration source member may consist of a film-like member formed directly on the base plate.

(3) In the light-beam scanning device set forth in the above (1) or (2), the mirror portion may have an area equal to or greater than 200 μm square or 200 μm φ, and a light-beam scanning rate of 10 kHz or more.

(4) In the light-beam scanning device set forth in any of the above (1) to (3), the base plate may be formed in such a manner as to be partly removed while leaving the torsion beam portion and the mirror portion therein.

(5) In the light-beam scanning device set forth in any of the above (1) to (4), the base plate may be supported in a cantilevered manner.

(6) In the light-beam scanning device set forth in any of the above (1) to (5), the base plate may be made of an electrically conductive material including stainless steel.

(7) In the light-beam scanning device set forth in any of the above (1) to (5), the base plate may be made of a non-magnetic material including Si.

(8) In the light-beam scanning device set forth in any of the above (1) to (7), the base plate may have a pair of opposite lateral portions each supporting a corresponding one of opposite ends of the torsion beam portion. Each of the lateral portions is formed in a cantilever configuration.

(9) In the light-beam scanning device set forth in any of the above (1) to (8), the mirror portion may have opposite lateral edges supported at a center-of-gravity position thereof by the torsion beam portion.

(10) In the light-beam scanning device set forth in any of the above (1) to (8), the mirror portion may have opposite lateral edges supported at a position deviated from a center-of-gravity position thereof by the torsion beam portion.

(11) In the light-beam scanning device set forth in any of the above (1) to (10), the mirror portion may have a given initial twist angle relative to a horizontal position parallel to a plane of the base plate.

(12) In the light-beam scanning device set forth in any of the above (1) to (11), the mirror portion and the vibration source member may be disposed in the same plane.

(13) In the light-beam scanning device set forth in any of the above (1) to (12), the mirror portion may be disposed around a position where the plate wave induced in the base plate by the vibration source member has a maximum amplitude.

(14) In the light-beam scanning device set forth in any of the above (1) to (12), the mirror portion may be disposed around a position where the plate wave induced in the base plate by the vibration source member has a minimum amplitude.

(15) In the light-beam scanning device set forth in any of the above (1) to (14), the vibration source member may be disposed at a position deviated from an axis of the torsion beam portion in a direction substantially perpendicular to the axis of the torsion beam portion.

(16) In the light-beam scanning device set forth in the above (15), the vibration source member may be disposed in such a manner that a distance between a center of the vibration source member and the axis of the torsion beam portion has a value derived by adding $\lambda/4$ to an integral multiple of $\lambda/2$, wherein $\lambda$ is a wavelength of the plate wave.

(17) In the light-beam scanning device set forth in the above (15), the vibration source member may be disposed in such a manner that a distance between a center of the vibration source member and the axis of the torsion beam portion has an integral multiple value of $\lambda/2$, wherein $\lambda$ is a wavelength of the plate wave.

(18) In the light-beam scanning device set forth in any of the above (1) to (17), the vibration source member may be formed directly on the base plate through an aerosol deposition process.

(19) In the light-beam scanning device set forth in any of the above (1) to (18), the vibration source member may have an area (S) ranging from greater than $(\lambda/100)^2$ to less than $\lambda^2$, wherein $\lambda$ is a wavelength of the plate wave, and the piezoelectric member has a thickness ranging from about 1 to 100 μm.

The present invention having the above features can generate a plate wave in the base plate supporting the mirror portion, by the vibration source member, such as a piezoelectric element, so as to produce a rotational moment in the mirror portion according to the plate wave and induce a large torsional amplitude in the mirror portion by means of a resonance phenomenon.

The present invention has at least the following advantages. However, the embodiments may not have the following advantages, or any advantages, without departing from the scope of the present invention.

(1) A high-performance light-beam scanning device can be provided which achieves a high-speed light-beam scanning rate of at least about 10 kHz or more, and a large-amplitude light-beam scanning angle of about 20° or more, using the mirror portion with an area of about 1 mm φ which meets requirements of video display area and image granularity in the field of image display devices.

(2) A torsional oscillation of the mirror portion can be achieved regardless of whether the mirror portion is supported at a center of gravity thereof or at a position deviated from the center of gravity.

(3) The center-of-gravity position of the mirror portion can be slightly deviated from the connection position of the torsion bar portion to effectively oscillate the mirror portion while preventing the occurrence of hysteresis.

(4) Simplification in structural and reduction in fabrication cost can be facilitated.

(5) A large-amplitude oscillation can be produced in the mirror portion using a substantially small vibration source member.

(6) A piezoelectric film serving as the vibration source member can have substantially reduced power consumption.

(7) The piezoelectric film can be arranged with increased flexibility to facilitate reduction in area and/or thickness of the light-beam scanning device.

BRIEF DESCRIPTION OF THE DRAWINGS

FIGS. 13(a) and 13(b) show a plate wave induced in a surface of the light-beam scanning device in FIGS. 12(a) to 12(c) having a free end with a removed portion, wherein FIGS. 13(a) and 13(b) are, respectively, a top plan view and a perspective view of the plate wave.

DETAILED DESCRIPTION

With reference to the drawings, the best mode for carrying out a light-beam scanning device of the exemplary, non-limiting embodiments of the invention will now be described. It is understood that the dimensions of components or members in the following description will be shown by way of example, and the present invention is not limited to such a specific value.

FIGS. 1(a) to 5 illustrate a principle of plate-wave generation and fundamental structural elements required for the light-beam scanning device of the present invention. As used in this application, "vibration source member" refers to the member that is coupled to a base plate and generates a vibration in response to an external stimulus.

[Principle of Plate-Wave Generation]

In generating a plate wave in a base plate 10, a piezoelectric member fixed onto the base plate 10 is vibrated. The piezoelectric member may consist of a piezoelectric film formed directly on the base plate 10 to provide enhanced plate-wave excitation efficiency.

Figure 1A:
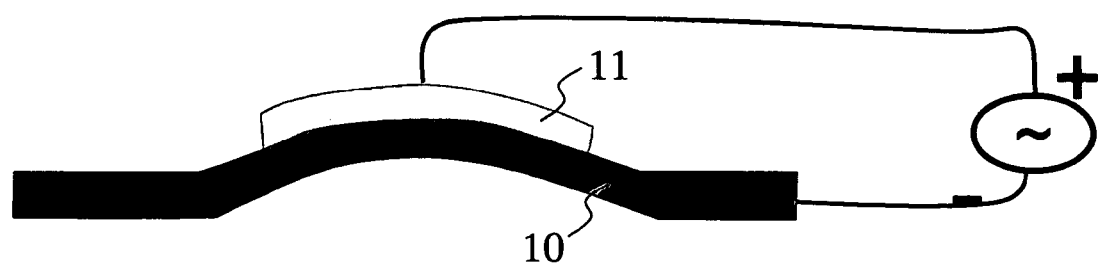
FIGS. 1(a) and 1(b) are schematic explanatory diagrams of the principle of plate-wave generation of the present invention.
Figure 1B:
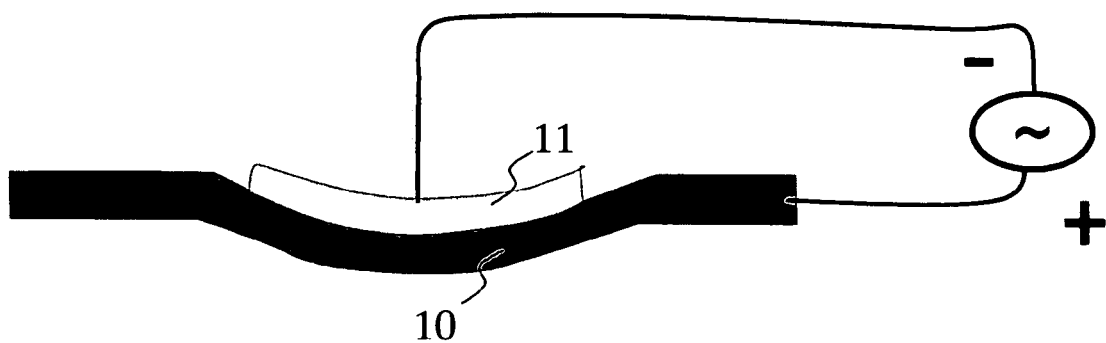

The following description discloses plate-wave generation using such a piezoelectric film. It is efficient to primarily utilize a transverse displacement mode (d31 mode) where the piezoelectric film elongates and shrinks in a direction parallel to an in-plane direction of the base plate 10 in response to a voltage applied to the piezoelectric film in its thickness direction. In this case, as shown in FIGS. 1(a) and (b), a portion of the base plate 10 located immediately below the piezoelectric film 11 undergoes bending deformation together with the piezoelectric film 11 to generate a Lamb wave in the base plate. When a positive voltage is applied to the piezoelectric film 11 as shown in FIG. 1(a), the piezoelectric film 11 stretches, and when a negative voltage is applied to the piezoelectric film 11 as shown in FIG. 1(b), the piezoelectric film 11 shrinks.

Figure 2A:
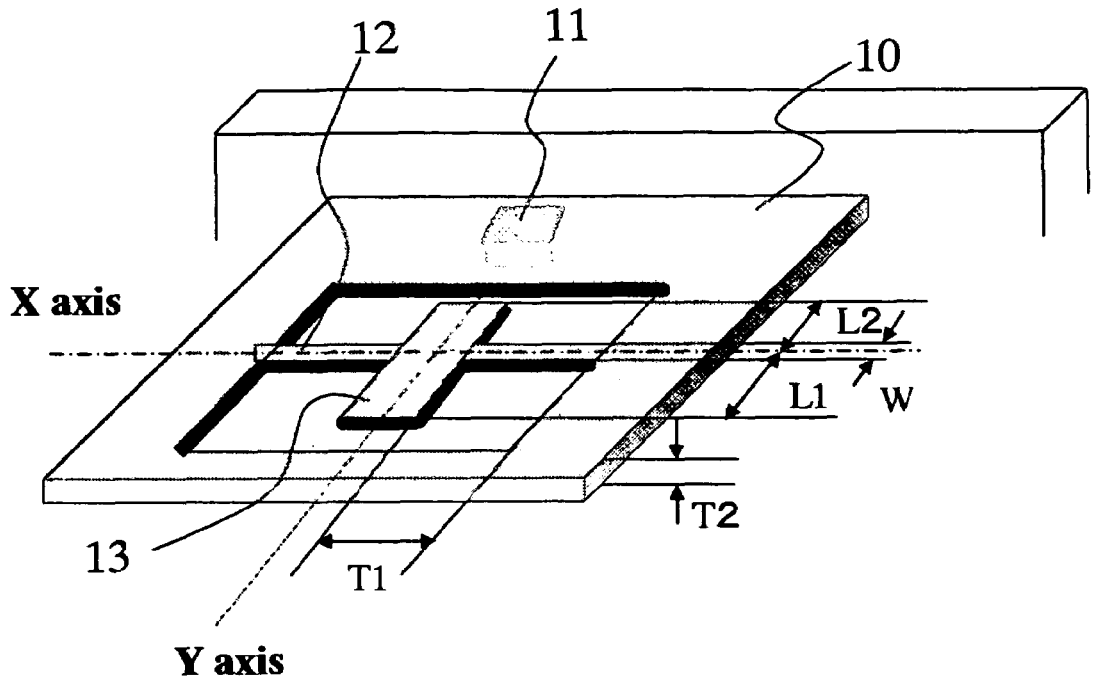
FIGS. 2(a) and (b) are schematic explanatory diagrams of fundamental structural elements of the present invention.
Figure 2B:
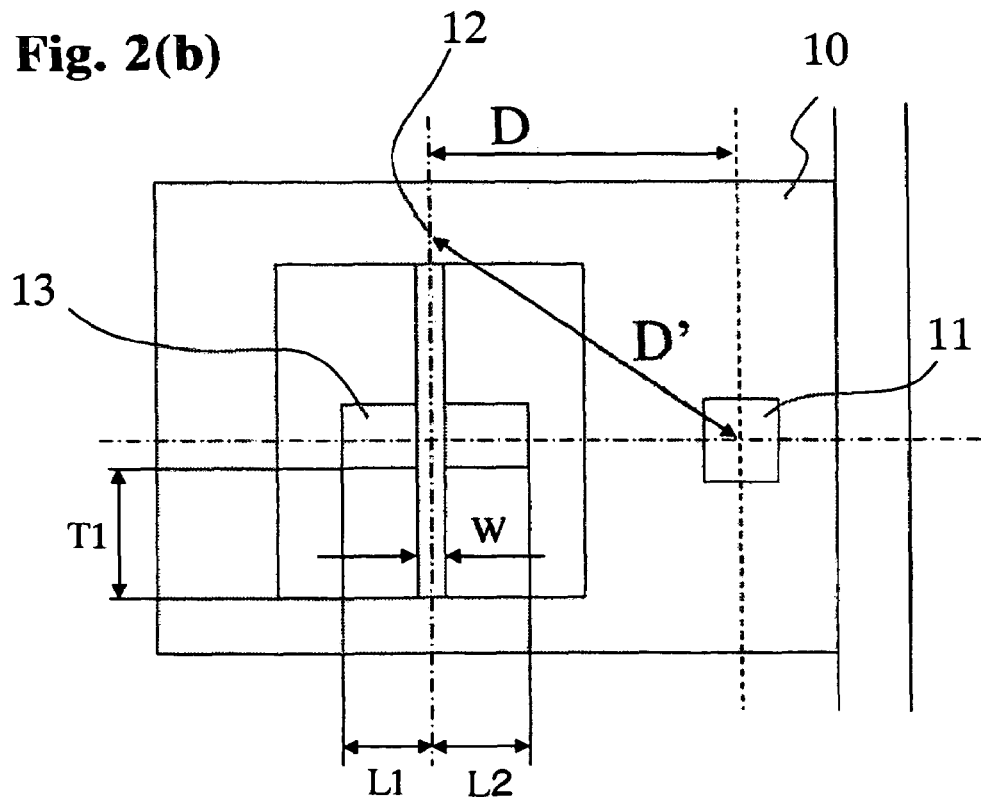

The resulting plate wave can act as a force for producing a rotational moment in a mirror portion 13 supported in a horizontal position by a torsion beam portion 12, as shown in FIGS. 2(a) and 2(b), and inducing a torsional oscillation in the mirror portion 13. If the mirror portion 13 is supported by the torsion beam portion 12 at a position (L1≠L2) which is deviated from a center-of-gravity position thereof in a direction perpendicular to an axis of the torsion beam portion 12 (in a Y-axis direction), a rotational moment in a mirror portion 13 can be readily produced by vertical vibrations generated by the plate wave at a position adjacent to the mirror portion 13 in a Z-axis direction perpendicular to an in-plane direction of the base plate 10.

On the other hand, even if the mirror portion 13 is supported by the torsion beam portion 12 at a position corresponding to the center-of-gravity position thereof (L1=L2), the piezoelectric film 11 serving as a vibration source member may be located at a position asymmetric to an X-axis-directional position of the mirror portion 13 on the base plate 10. As a result, the plate wave can generate rotational-moment-inducing torsional vibrations adjacent to the mirror portion 13 and the torsion beam portion 12 to induce a rotational moment in the mirror portion 13 and thus achieve a torsional oscillation movement capable of deflecting a scanning light beam.

The base plate 10 may be supported only at one edge thereof in a cantilevered manner to facilitate liberating vibrational energy of the plate wave at a position adjacent to the mirror portion 13, so as to more reliably produce a rotational moment in the mirror portion 13 with higher efficiency and more efficiently generate torsional oscillation.

While the principle of driving a torsional oscillation of the mirror portion has been described in connection with the example using a piezoelectric film, a magnetostrictive film capable of elongating and shrinking in response to an externally-applied alternating magnetic field, or a permanent magnet film capable of being drawn and repelled by an externally-applied alternating magnetic field, may be used in place of the piezoelectric film to generate a rotational moment in the mirror portion to drive the mirror portion based on substantially the same principle. In particular, when the magnetostrictive film is made of a super or giant-magnetostrictive material, it can be expected to obtain a higher driving efficiency in terms of energy as compared to the piezoelectric film.

The above externally applied alternating magnetic field may be generated by placing a coil in the vicinity of the base plate, and supplying an AC current to the coil. As compared to the piezoelectric-based driving, this current-based driving can facilitate reducing a driving voltage so as to allow an associated circuit configuration to be simplified. When a plate wave is generated using such a magnetostrictive film or permanent magnet film, the base plate can be made of a non-magnetic material to efficiently generate the plate wave.

As above, there is no substantial difference between the use of a piezoelectric film and the use of a magnetostrictive or permanent magnet film as the vibration source or driving source. On this premise, the following description about the present invention will be made for the case of a piezoelectric film.

[Position of Piezoelectric Film]

A position of the piezoelectric film 11 relative to the mirror portion 13 is a key point in generating a plate wave from the piezoelectric film 11 located at a position away from the mirror portion 13 of the light-beam scanning device so as to obtain a torsional angle with a maximum amplitude under a constant driving voltage. This generation efficiency is increased by forming the piezoelectric film 11 positioned on a line parallel to an axial (X-axis) direction of the torsion beam portion 12, and on a longitudinal axis of the mirror portion 13 passing through a center of gravity thereof located (or a Y-axis which extends in a direction perpendicular to the axis of the torsion beam portion 12 in the plane of the base plate 10). Further, when a position where the torsion beam portion 12 supporting the mirror portion 13 is fixed (or integrally connected) to the base plate 10 is deviated from the center-of-gravity position of the mirror portion 13 in a direction substantially perpendicular to the axis of the torsion beam portion 12, the piezoelectric film 11 is positioned such that a plate wave has a maximum amplitude in the vicinity of the position where the torsion beam portion 12 supporting the mirror portion 13 is connected to the base plate 10. The piezoelectric film 11 can be positioned such that a direction (D) between a center of the piezoelectric film 11 and the axis of the torsion beam portion 12 becomes equal to an integral multiple of $\lambda/2$, wherein $\lambda$ represents a wavelength of the plate wave (an antinode of the plate wave is located substantially near the above-described connection position of the torsion beam portion 12).

On the other hand, when the center of gravity of the mirror portion 13 is positioned in alignment with the above connection position of the torsion beam portion 12, the piezoelectric film 11 is positioned such that the plate wave has a minimum amplitude at the connection position between the base plate 10 and the torsion beam portion 12 supporting the mirror portion 13 (a node of the plate wave is located substantially near the above-described connection position of the torsion beam portion 12). In this case, the piezoelectric film 11 may be positioned such that the direction (D) between the center of the piezoelectric film 11 and the axis of the torsion beam portion 12 becomes equal to an integral multiple of $\lambda/2 + \lambda/4$, such that a rotational moment can be readily produced in the torsion beam portion 12.

Figure 3:
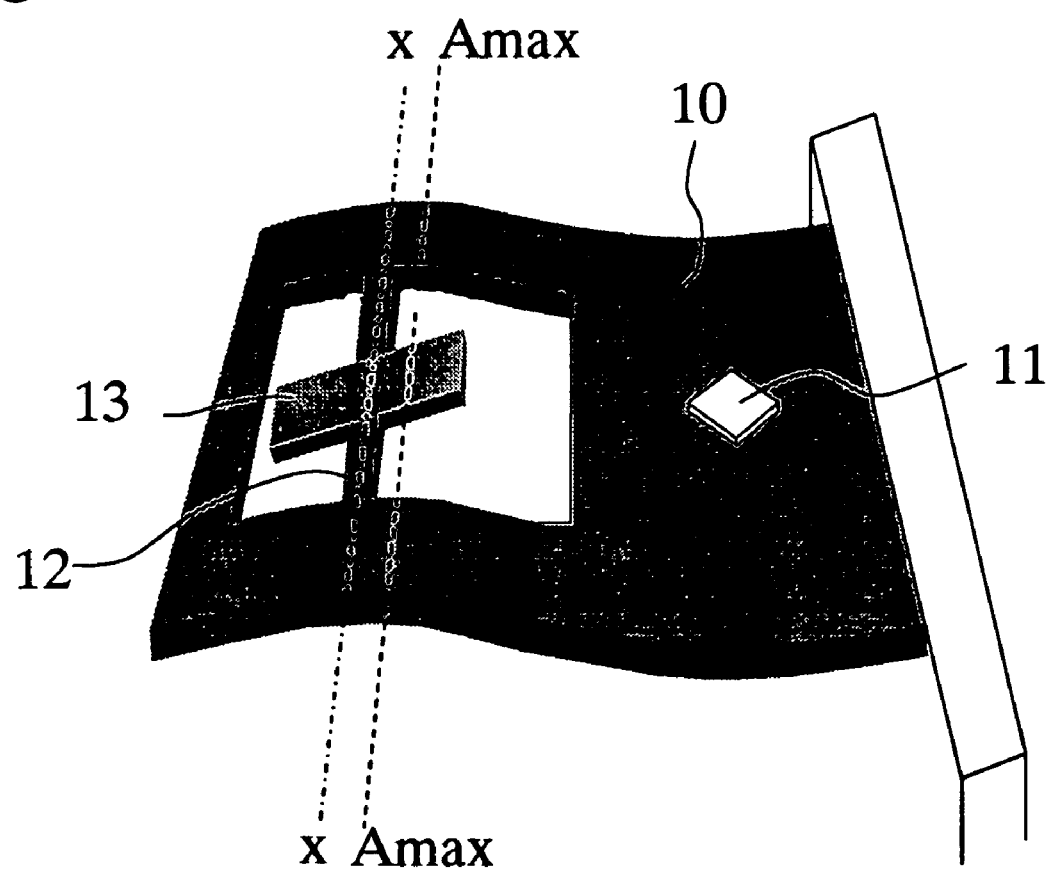
FIG. 3 is an explanatory diagram of the position of a piezoelectric film in the present invention, wherein the piezoelectric film is disposed in such a manner that vibrations in a base plate have a maximum amplitude at a position slightly deviated from an axis of a torsion beam portion.

In the foregoing cases where the center of gravity of the mirror portion 13 is aligned with the connection position of the torsion beam portion 12, a maximum amplitude Amax (antinode of the plate wave) or a minimum amplitude Amin (node of the plate wave) of vibrations generated in the base plate 10 may be formed at a position slightly deviated from the connection position between the torsion beam portion 12 and the base plate 10 as shown in FIG. 3, such that a vertical vibration (Z-axis directional displacement) that occurs in the torsion beam portion 12 is minimized, and a rational moment in the mirror portion 13 is efficiently produced, so as to perform an efficient driving.

[Thickness, Area and Shape of Piezoelectric Film]

The thickness and area of the piezoelectric film 11 formed in the base plate 10 of the light-beam scanning device to generate a plate wave for oscillating the mirror portion must be set at optimal values depending on a thickness and area of the base plate 10.

Figure 4:
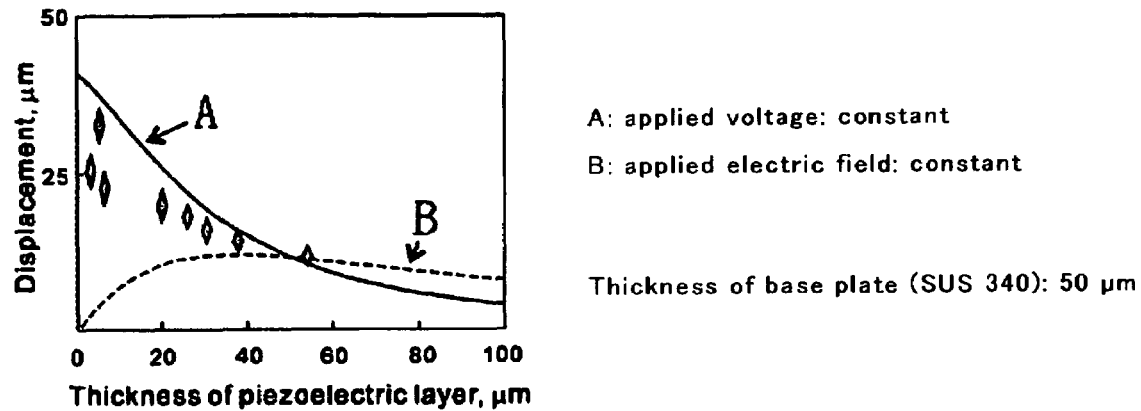
FIG. 4 is a graph showing a dependence of a displacement in a piezoelectric unimorph structure on a thickness of the piezoelectric film, in the present invention.

The amplitude of a bending deformation induced on the base plate 10 by a voltage according to the aforementioned principle of driving the mirror portion is one-dimensionally approximated by the following formula expressing a displacement in a piezoelectric unimorph actuator structure. As shown in FIG. 4, when an electric field to be applied to the piezoelectric film 11 is kept at a substantially constant intensity (V/m), the base plate and the piezoelectric film 11 are made, respectively, of Si or a stainless-steel material (SUS), and a lead zirconate titanate which is a piezoelectric material. Further, the displacement of the piezoelectric unimorph actuator structure or the amplitude of the bending deformation is maximized when the piezoelectric film 11 has a thickness approximately equal to that of the base plate 10.

$$\delta = \frac{3}{2} \frac{l^2}{t_p^2} \frac{2xy(1+x)}{1 + 4xy + 6x^2y + 4x^3y + x^4y^2} d_{31} V \quad (1)$$

wherein: I is a length of the piezoelectric film; $t_p$ is a thickness of the piezoelectric film; $t_s$ is a thickness of the base plate; x is $t_s/t_p$; y is $Y_s/Y_p$ (wherein $Y_s$ is a Young's modulus of the base plate, and Yp is a Young's modulus of the piezoelectric film), and $d_{31}$ is a transverse piezoelectric constant of the piezoelectric film.

Further, considering use conditions of the light-beam scanning device, a larger displacement will be obtained as the film thickness is increased under a constant driving voltage (voltage applied to the piezoelectric film). In practice, when the piezoelectric film is formed on a metal base plate, for example through an AD (Aerosol Deposition) process, the displacement is dependent on characteristics and a thickness of the piezoelectric film. Specifically, an excessively small thickness of the piezoelectric film causes deterioration in piezoelectric characteristics and in film characteristics, such as increase in leak current, and an excessively large thickness of the piezoelectric film causes difficulties in a polarization treatment. As to a thickness of the base plate 10, on the assumption that the base plate is made of Si or a stainless-steel material in consideration of a flatness of the mirror portion during operations and an area of the mirror portion required in applications to projector devices or the like, the base plate 10 must have a thickness of at least 10 μm. In view of the above factors, an optimal thickness of the piezoelectric film for the light-beam scanning device may be in the range of about 1 to 100 µm, and further in the range of 5 to 50 µm. The mirror portion having such a thickness in unit area can have a maximum light-beam scanning angle at a minimum driving voltage or with minimum power consumption.

As to a shape and area of the piezoelectric film, in a propagation direction of a plate wave or vibration on the base plate, the piezoelectric film 11 with a thickness falling within the above range may have a length less than a wavelength of the plate wave to be determined substantially by a resonant frequency for driving the light-beam scanning device and a sound propagation speed in a material of the base plate, so as to efficiently drive the mirror portion. In the piezoelectric film having such a length, the mirror portion can have a larger light-beam canning angle as an area (driving area) of the piezoelectric film 11 is increased. However, power consumption is also increased in conjunction with the increase in the area. Thus, in view of actual intended purposes of the light-beam scanning device, such as application to mobile or portable devices, there is an optimal film area (S). According to experimental data, given that a wavelength of the plate wave is $\lambda$, the film area S is in the range of greater than $(\lambda/100)^2$ to less than $\lambda^2$, and optionally in the range of greater than $(\lambda/10)^2$ to less than $(\lambda/2)^2$. In a light-beam scanning device designed to have a resonant frequency of about 25 kHz, when $\lambda$ was set at 4 mm, and a piezoelectric film was formed to have a square shape having $\lambda/4=1$ mm on a side, a light-beam scanning angle was 30 degrees, and the power consumption was 100 mW or less.

[Center-of-Gravity Position of Mirror Portion]

Figure 5:
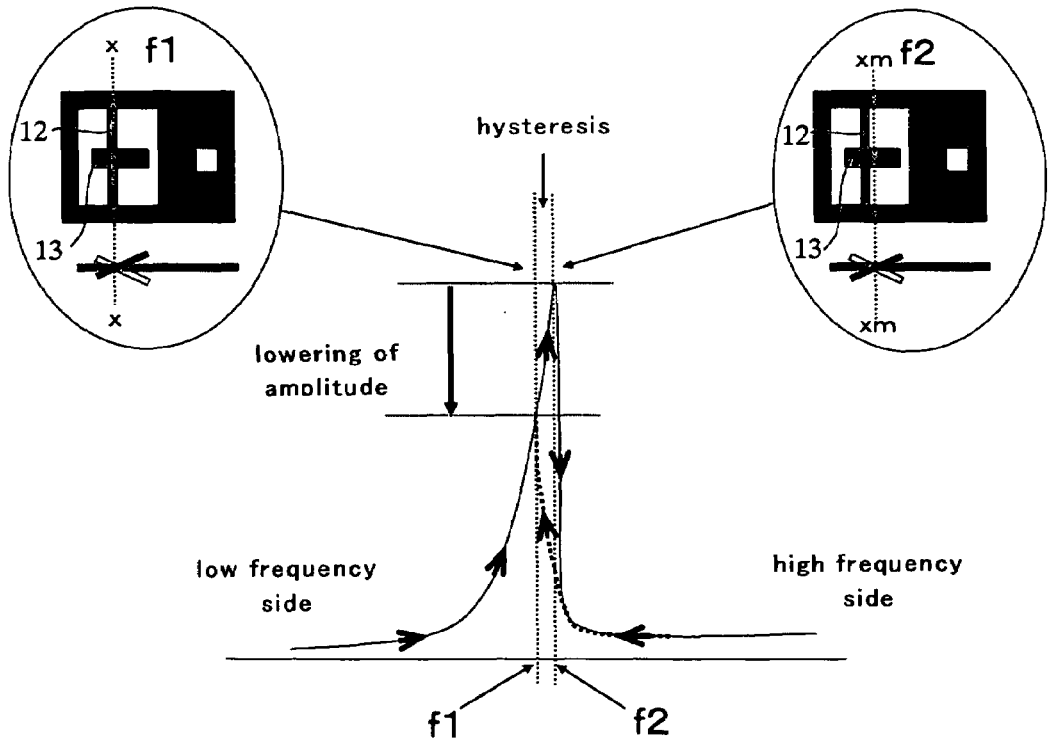
FIG. 5 is an explanatory diagram of a large hysteresis occurring in two situations where a driving frequency comes close to resonant frequencies from a low frequency side and where the driving frequency comes close to the resonant frequencies from a high frequency side, when a center-of-gravity portion of a mirror portion is deviated from an axis of the torsion beam portion in a direction perpendicular to the axis of the torsion beam portion.

As to the connection position of the torsion beam portion 12 supporting the mirror portion 13 of the light-beam scanning device, if a center-of-gravity position of the mirror portion 13 is set at a position deviated from an axis of the torsion beam portion 12 in a direction perpendicular to the axis of the torsion beam portion 12, two resonant frequencies f1, f2 of a first torsional resonance mode around the axis (X-axis) of the torsion beam portion 12 and a second torsional resonance mode around the center-of-gravity position (Xm) of the mirror portion 13, will be generated as shown in FIG. 5. The difference between the two resonant frequencies f1, f2 is a small value.

When the driving frequency approaches the resonant frequencies from a low frequency side and when the driving frequency approaches the resonant frequencies from a high frequency side, a torsional vibration of the mirror portion around the resonant frequencies has different angular amplitudes (light-beam scanning angle), and a large hysteresis occurs therein, which poses practical problems. For example but not by way of limitation, the machine constants of the light-beam scanning device may be changed due to fluctuation in ambient temperature, so as to cause change in resonant frequency and variation in light-beam scanning angle. While this variation is generally corrected by changing a driving frequency to be applied to the piezoelectric film 11, a nonlinearity of the above hysteresis requires a significantly complicated or impractical correction control: In contrast, when the center-of-gravity position of the mirror portion 13 is aligned with the supported or connection position of the torsion beam portion 12, excellent resonance characteristics can be obtained without occurrence of the above hysteresis.

However, if the center-of-gravity position of the mirror portion 13 is aligned with the connection position of the torsion beam portion 12, a time-period (rise time) between initiation of a vibration in the piezoelectric film 11 and achievement of a maximum light-beam scanning angle (angular amplitude of a torsional vibration in the mirror portion) in a resonant state will be extended as compared to the case where the center-of-gravity position of the mirror portion 13 is slightly deviated from the connection position of the torsion beam portion 12. For example but not by way of limitation, when the light-beam scanning device is applied to a portable device, and designed to be driven by a built-in battery, the device is likely to be deactivated or turned off when no light beam scanning operation is performed, to reduce power consumption. When the light-beam scanning operation is restarted from the deactivated state, a time-period required for reaching a steady state poses a practical problem.

Thus, the actual device is likely to need to deviate the center-of-gravity position of the mirror portion 13 from the connection position of the torsion beam portion 12 by an appropriate distance so as to strike a balance between the above conflicting characteristics required for the light-beam scanning device. A practical appropriate deviation ($\Delta L=(L1-L2)/(L1+L2)$) obtained by experimental data is in the range of zero to 0.2, and further in the range of zero to 0.05.

As another solution to the above problem, when the base plate is made of a metal material, such as stainless steel, having ductility differently from Si, a force equal to or greater than an elastic limit of the base plate may be applied to the base plate to provide a slight twist in the torsion beam portion so as to allow the mirror portion to have a twist angle of about several degrees relative to a horizontal position parallel to the plane of the base plate. This slight twisting makes it possible to more efficiently convert a plate wave or vibration induced in the base plate to a rotational moment in the mirror portion, and achieves a reduced rise time or a quick start of the operation while suppressing the above-described hysteresis problem.

[Cross Section of Torsion Beam Portion]

While the torsion beam portion 12 supporting the mirror portion 13 is formed to have a cross section with an axisymmetric circular shape, the cross section of the torsion beam portion 12 has a rectangular shape with a finite width, because the torsion beam portion 12 is formed from a plate material in an actual fabrication process. Thus, if the torsion beam portion has an excessively large width (W), a slight fabrication error is likely to cause a phenomenon such that a position of the axis of the torsion beam portion 12 is moved within the width (W) in a resonant state, which leads to the hysteresis phenomenon in an angular amplitude of a torsional vibration (light-beam scanning angle) occurring in a driving-frequency range around the aforementioned resonant frequencies. As a result, it is difficult to perform adequate driving control. This driving control problem must be solved by setting the width of the torsion beam portion at a given value or less. According to experimental data, given that a length of the torsion beam portion is $T_1$ and a thickness of the base plate is $T_2$, it is required to satisfy the following relationship: $W/T_1 \leq 0.2$ or $0.1 \leq T_2/W \leq 1$, optionally $W/T_1 \leq 0.1$ or $0.5 \leq T_2/W \leq 1$.

[Area, Thickness, Flatness and Surface Roughness of Mirror Portion]

In an oscillator having the above torsion beam structure as an optical component, such as a light beam scanner, the mirror portion 13 must have a flatness of $\lambda 0/8$ during operations (wherein $\lambda 0$ is a wavelength of light to be reflected by the mirror portion). Accordingly, the mirror portion 13 must have a mechanical strength allowing the flatness to be reliably maintained in a resonant state in the atmosphere. According to experimental data, given that the base material is made of Si or a stainless-steel material, the mirror portion must have a thickness of at least 10 µm. When the light-beam scanning device is applied to projector devices or the like, in order to adequately converge a light beam and form a light spot having a sufficient luminance and a sufficiently small diameter at a focal position, the mirror portion must have an area ranging from at least 200 μm square or 200 μm φ to about 1 mm square or 1 mm φ, because a numerical aperture (N.A.) of the light beam and the intensity of the light spot are determined by the area of the mirror portion. To allow a flatness of the mirror portion having the above area to be reliably maintained during driving in the atmosphere, the mirror portion must have a thickness of at least 30 μm or more, optionally about 50 μm.

As to surface roughness, the mirror portion must have an average roughness (Ra) of about 50 nm or less. If the mirror portion cannot be formed from a base plate made of a metal material with the above flatness and surface roughness at low cost, a mirror prepared by forming a high-reflectance film on a Si or glass substrate may be attached onto the mirror portion 13.

[Formation Method for Piezoelectric Film and Material of Base Plate]

The piezoelectric film may be formed through an aerosol deposition (AD) process which is a low-temperature, high-speed process. In this case, a thick film having a thickness of several micrometers can be formed directly on a metal base plate or the like readily in a short period of time. However, the formation method is not limited to the AD process. For example but not by way of limitation, if the base plate is made of a heat-resistant material, such as Si, any suitable conventional thin-film formation technique, such as a sputtering process, a CVD process or a sol-gel process, may be used for forming an epitaxially-grown high-performance piezoelectric thin film. This film is advantageous in providing a light-beam scanning device capable of being driven at a lower driving voltage with lower power consumption.

As to the base plate material for the light-beam scanning device based on a mechanical resonance of the mirror portion, stability against temperature variations in the use environment is one of key factors. The stability is greatly affected by properties, primarily a thermal expansion coefficient, of a material of the base plate. Si or quartz (thermal expansion coefficient: $3.5 \times 10^{-6}$/K, $0.5 \times 10^{-6}$/K may be suitably used as a material of the base plate. Further, when a metal such as stainless steel is used as a material of the base plate to form a light-beam scanning device at low cost, a metal material having a low thermal expansion coefficient, such as invar, super invar or kovar (thermal expansion coefficient: 1 to $3 \times 10^{-6}$/K) may be used as a material of the base plate in place of SUS 304 (thermal expansion coefficient: $17.3 \times 10^{-6}$/K) as in the Example discussed below.

First Embodiment

Figure 6:
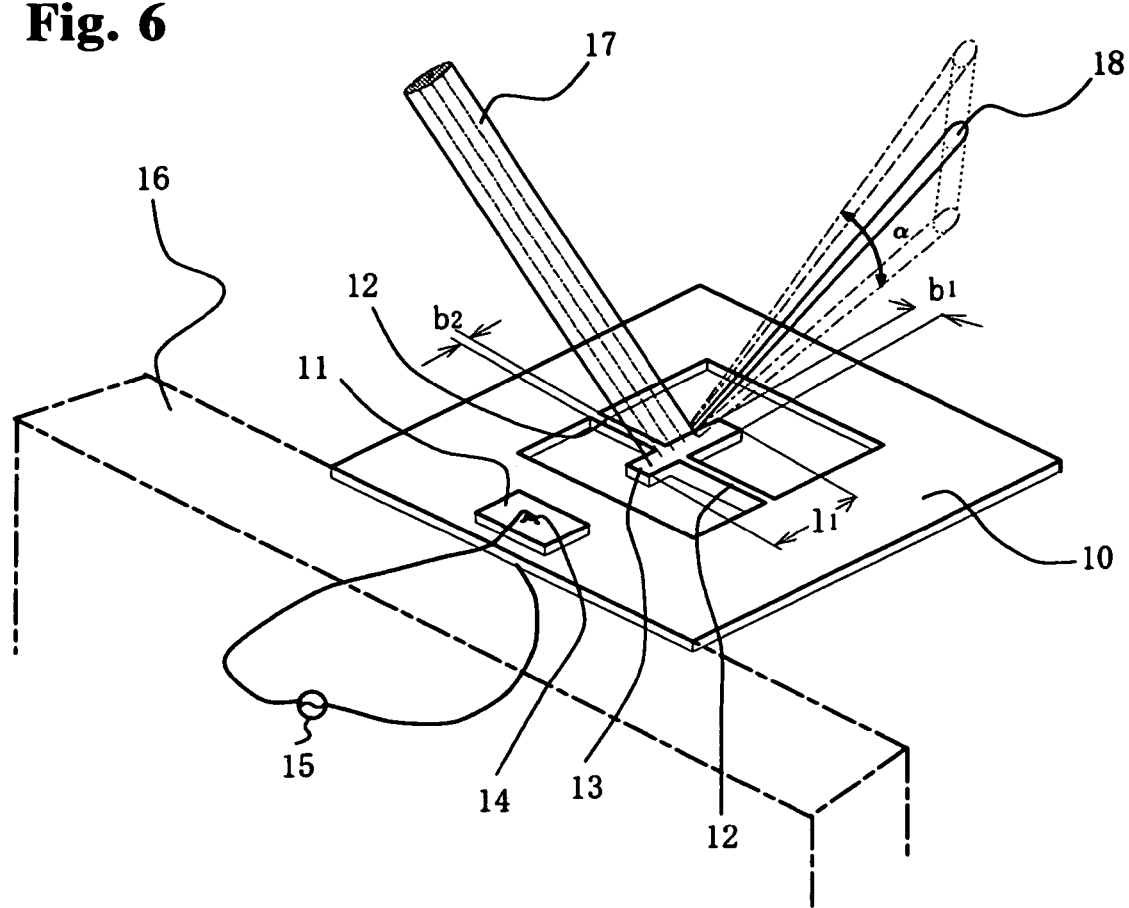
FIG. 6 is a perspective view showing a light-beam scanning device according to a first exemplary, non-limiting embodiment of the present invention.

FIG. 6 is a perspective view of a light-beam scanning device according to a first exemplary, non-limiting embodiment of the present invention.

A base plate 10 is fabricated by subjecting a metal material having a substantially square shape with a thickness of about 30 to 50 μm to an etch process or a press working to form the plate material so as to be partly removed while leaving a torsion beam portion 12 and a mirror portion 13 therein. Only one end of the base plate 10 is supported by a support member 16 in a cantilevered manner.

The base plate 10 is made of a metal material, such as SUS 304 having electrical conductivity or SUS 430 having electrical conductivity and low thermal expansion coefficient, so as to eliminate the need for forming a lower electrode to facilitate reduction in size and simplification in structure of the light-beam scanning device.

The mirror portion 13 is formed to have a length $l_1$ of about 1.1 mm and a width $b_1$ of about 100 to 500 μm. The torsion beam portion 12 extending from opposite side edges of the mirror portion 13 is formed to have a width b2 of about 80 to 100 μm.

In FIG. 6, the torsion beam portion 12 supporting the mirror portion 13 is disposed at a position deviated from a center-of-gravity position of the mirror portion 13 by about 100 μm or less in a direction substantially perpendicular to an axis of the torsion beam portion 12. Alternatively, the torsion beam portion 12 supporting the mirror portion 13 may be disposed at a position corresponding to the center-of-gravity position on an axis of the mirror portion 13 substantially perpendicular to the axis of the torsion beam portion 12.

Any one of a piezoelectric film, a magnetostrictive film and a permanent magnet film 11 is formed directly on a portion of the base plate 10 through a mask-based film formation method using an AD process invented by the inventors, without interposing adhesive therebetween.

The piezoelectric film 11 is made, for example but not by way of limitation, of lead zirconate titanate (PZT) which is a typical piezoelectric material, and formed to have an area of 1 mm square and a thickness of 10 to 20 μm.

The magnetostrictive film 11 is made, for example but not by way of limitation, of a giant-magnetostrictive alloy having a composition expressed by RTy (wherein: R is one or more of rare-earth metals; T is one or more of transition metals; and 1<y<4), and formed to have an area of about 1 mm square and a thickness of about 10 to 20 μm.

In the above composition formula, R is one or more of the rare-earth metals of lanthanoid series elements including Y and actinoid series elements. Among the foregoing elements represented by R, one or more of Nd, Pr, Sm, Tb, Dy and Ho may be selected in an embodiment, and Tb and/or Dy may be selected in an embodiment. Among one or more of transition metals represented by T in the above composition formula, one or more of Fe, Co, Ni, Mn, Cr and Mo maybe selected in an embodiment, and one or more of Fe, Co and Ni may be selected in an embodiment. These elements may be used in combination.

The permanent magnet film is made, for example but not by way of limitation, of a neodymium-iron-boron-based or nitriding iron-based permanent magnet material having a high energy density, and formed to have an area of about 1 mm square and a thickness of about 10 to 20 μm.

The technique of forming the piezoelectric film 11 directly on the base plate 10 through the AD process will be described briefly.

Lead zirconate titanate (PZT) having a particle diameter of about 0.1 μm is mixed with gas to form aerosoled gas. Then, the aerosoled gas is sprayed onto a given portion of the base plate 10 in the form of a high-speed jet to form a film. During the film formation, a large mechanical shock acts on PZT fine particles due to collision of the PZT fine particles with the base plate 1, to cause crush of the PZT fine particles in concurrence with creation of a new surface so as to form a dense film. The piezoelectric film 11 formed in this way has ferroelectric characteristics.

The piezoelectric film 11 is formed at a position deviated from the torsion beam portion 12 that supports the mirror portion 13. More specifically, the deviation occurs in a direction substantially perpendicular to the axis of the torsion beam portion 12 and in a plane of the base plate. Further, the position of the piezoelectric film 11 is determined so as to allow the mirror portion 3 to be located where vibrations of a plate wave generated on the base plate 10 by the piezoelectric film 11 have a maximum amplitude.

After the formation of the piezoelectric film 11, the base plate 10 is subjected to a heat treatment in the atmosphere at about 600° C. for about 10 minutes, and then an upper electrode 14 is formed on a top surface of the piezoelectric film 11, for example but not by way of limitation, through a sputtering process using a gold target. Alternatively, instead of the sputtering process using a gold target, the upper electrode 14 may be formed through the AD process in succession to the formation of the piezoelectric film 11 to achieve simplification in fabrication process and reduction in cost.

Then, a wiring is formed to allow a certain voltage to be applied from a power supply 15 to the formed upper electrode 15 and the base plate 10 serving as a lower electrode therethrough.

When a certain voltage is applied to the base plate 10 and the upper electrode 14, the piezoelectric film 11 is piezoelectrically vibrated, and this vibration generates a plate wave (as used in the specification, the term "plate wave" means a wave having a vibrational direction parallel to a surface of the base plate and perpendicular to a propagation direction) in the base plate 10. This plate wave generated in the base plate 10 produces a rotational moment in the mirror portion 13 through the torsion beam portion 12 and induces a large-amplitude torsional oscillation in a resonant state.

As shown in FIG. 6, when a laser beam 17 is emitted onto the mirror portion 13 while applying the voltage to the upper electrode 14 and the base plate 10 serving as a lower electrode, the laser beam 18 reflected by the mirror portion 13 is vibrated at a given deflection angle a in conjunction with the torsional oscillation of the mirror portion 13.

Figure 7:
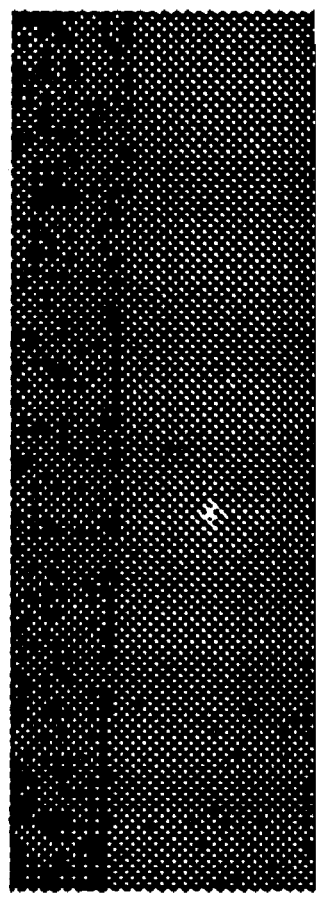
FIG. 7 is a diagram showing a projected image of a scanned beam from the light-beam scanning device according to the first embodiment.
Figure 7:
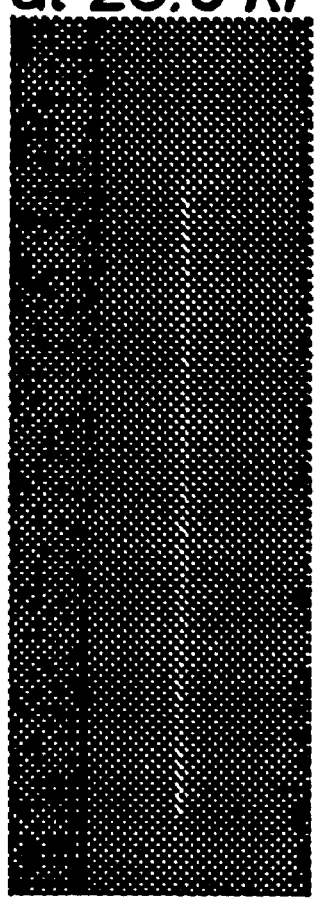

FIG. 7 shows a projected image of an actual scanned beam, wherein neither distortion nor blurring is observed. The image on the left side of FIG. 7 is that of the scanned beam at the zero position (i.e., no vibration), and the image on the right side of FIG. 7 is that of the scanned beam vibrated at a frequency of 23.6 kHz. The mirror area is about 1 mm×0.3 mm, and the incident laser beam is about 0.3 mm in diameter. As noted above, there is substantially no distortion or blurring.

Electrical characteristics of the PZT film fabricated through the AD process and used for driving are shown in the following table. Unless otherwise indicated, the disclosed ranges are approximate.

TABLE 1

Electric Characteristics of PZT Film and Characteristics of Base Plate

| | |
|---|---|
| Relative Permittivity (at 1 kHz) | 700 to 1800 |
| Dielectric Loss (tan δ, at 1 kHz) | 0.01 to 0.05 |
| Transverse Piezoelectric Constant ($d_{31}$) | −60 to −120 pm/V |
| Film Density | 7.5 to 8.1 g/cm$^3$ |
| Film Young's Modulus | 60 to 90 GPa |
| Base-Plate Young's Modulus | 150 to 200 GPa |

Figure 8:
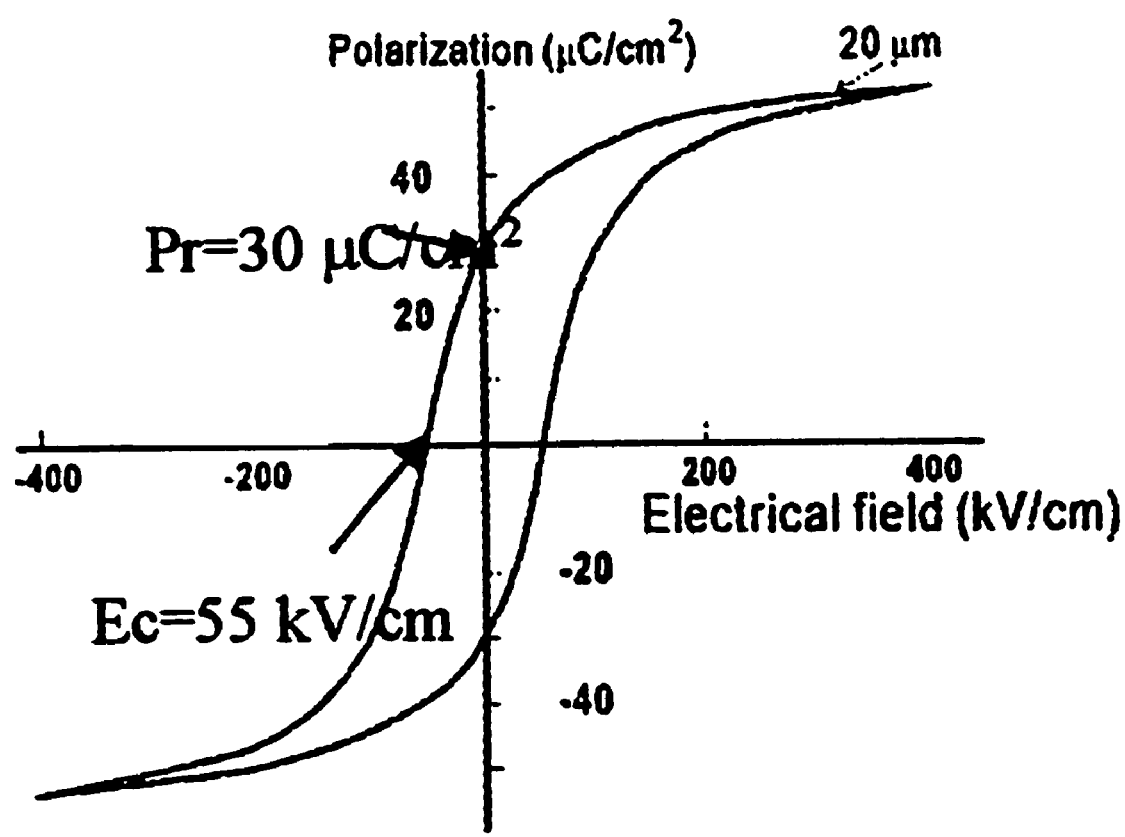
FIG. 8 is a graph showing a ferroelectric characteristic of a PZT (Lead Zirconate Titanate) film prepared through an AD process and used for driving in the light-beam scanning device according to the first embodiment.

FIG. 8 shows the ferroelectric characteristic of the PZT film fabricated through the AD process and used for driving.

Figure 9:
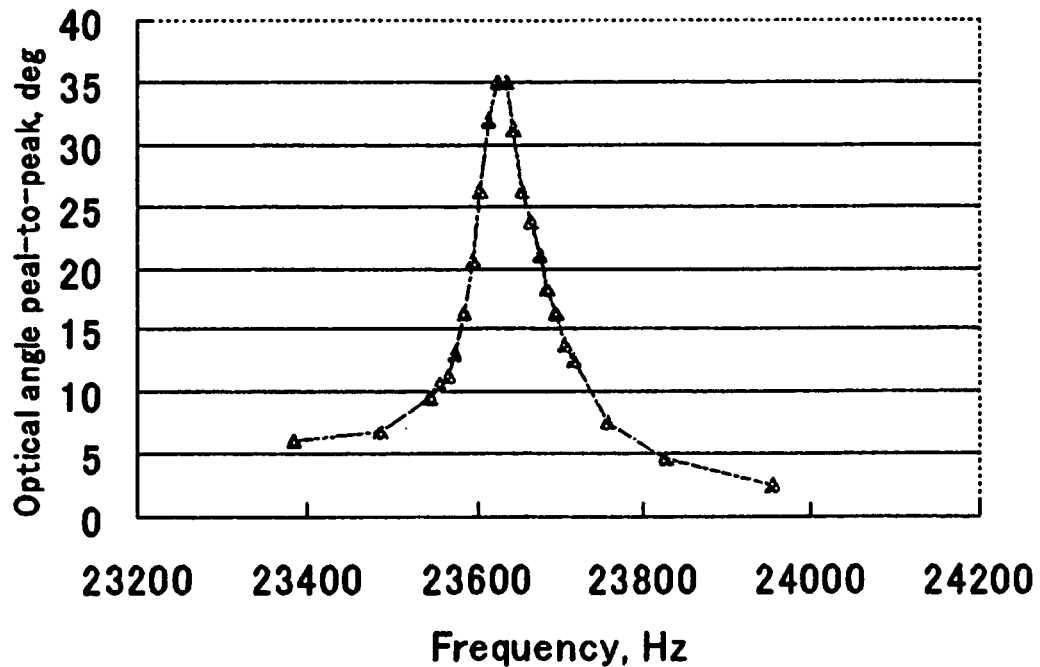
FIG. 9 is a graph showing a frequency characteristic of the light-beam scanning device according to the first embodiment to be used as an optical scanner.

FIG. 9 shows one example of a frequency characteristic of the light-beam scanning device fabricated in the above way, when it is used as an optical scanner. A first-order resonant frequency of the torsional oscillation is a significantly high value of about 23.7 kHz. This verifies that the light-beam scanning device can perform a high-speed operation. In a theoretical calculation focusing only on a resonance structure of the mirror portion 13, the first-order resonant frequency is calculated as a slightly higher value of 27 kHz. Further, the light-beam scanning device has a low Q value (wherein Q represents the level of decreased energy due to energy absorption of a medium during propagation of an elastic wave) of about 110, as compared to 600 or more in a Si-MEMS (Micro-Electromechanical Systems)-based scanner. This shows the light-beam scanning device is suitable for an optical scanner.

Figure 10:
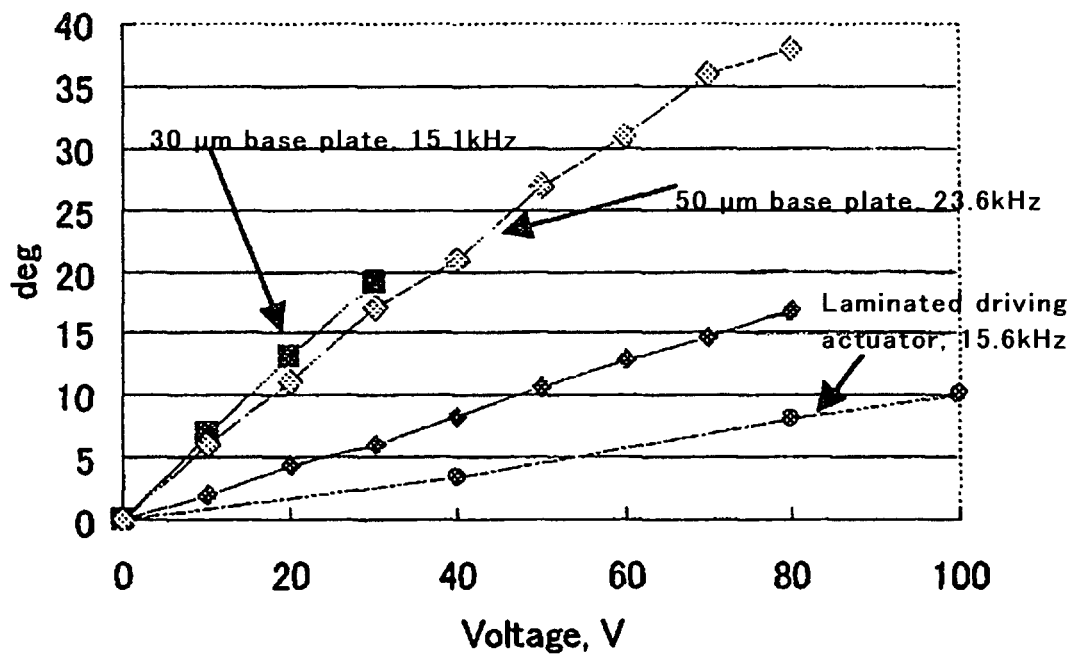
FIG. 10 is a graph showing a relationship between a driving voltage and a deflection angle of a scanned beam.

FIG. 10 shows a relationship between a driving voltage and a deflection angle of a scanned beam. This relationship was determined by comparing two light-beam scanning devices wherein a piezoelectric film having a thickness of about 10 μm was formed directly on two types of SUS base plates having thickness of about 30 and 50 μm through the AD process, with two comparative light-beam scanning devices, wherein a laminated actuator [laminated piezoelectric element with 1 mm square×2 mm thickness (pitch: 70 μm)] serving as a driving source was adhesively attached to the two types of base plates.

In the light-beam scanning devices using the piezoelectric film of about 10 μm thickness formed through the AD process, a deflection angle of about 20° was obtained at a driving voltage of 40 V. This value is one digit greater than the deflection angle of the conventional Si-MEMS-based scanner.

As seen in FIG. 10, while the difference in thickness of the base plate causes variations in spring constant of the torsion beam portion supporting the mirror portion so as to largely change a resonant frequency, the deflection angle in the mirror portion is not substantially affected by the difference in thickness.

In the comparative light-beam scanning devices using the laminated piezoelectric actuator adhesively attached to the base plates to serve as a driving source, in place of the piezoelectric film formed through the AD process, a deflection angle or a scan angle of the scanner is reduced to one-half or less, even though its piezoelectric constant is about two times greater than that of the piezoelectric film formed through the AD process. The reason is that the laminated piezoelectric element has an excessively large thickness of about 2 mm, and vibrational absorption of has a large adverse affect. As noted above, direct formation of a piezoelectric film with a thickness of about 100 μm or less through the AD process suitable for practical applications in terms of performance could be verified.

Second Embodiment

Figure 11A:
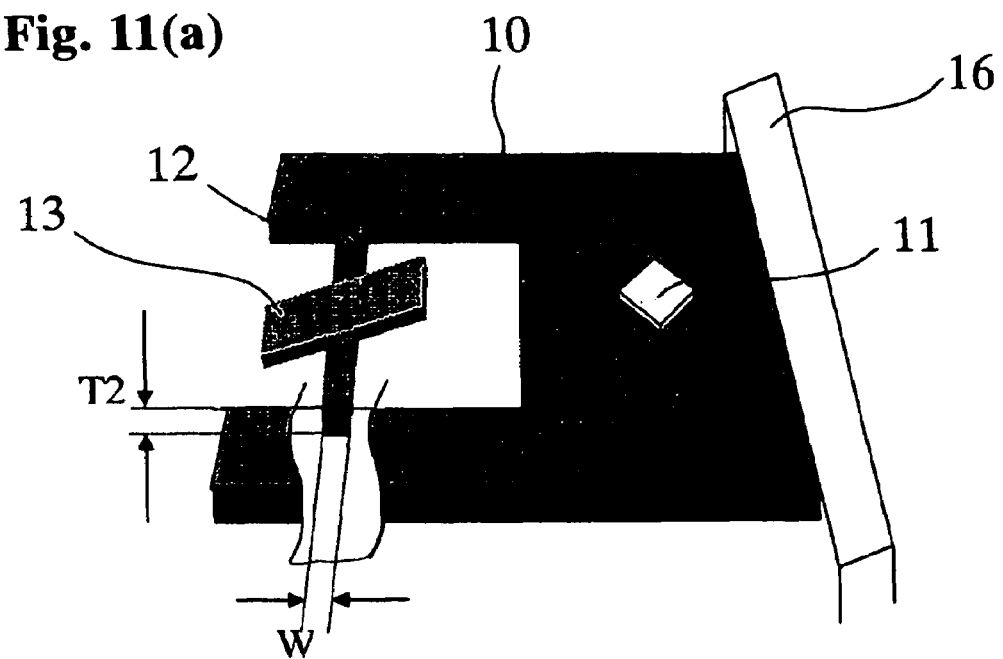
FIGS. 11(a) and 11(b) respectively show a perspective view and a top plan view of a light-beam scanning device according to a second exemplary, non-limiting embodiment of the present invention.
Figure 11B:
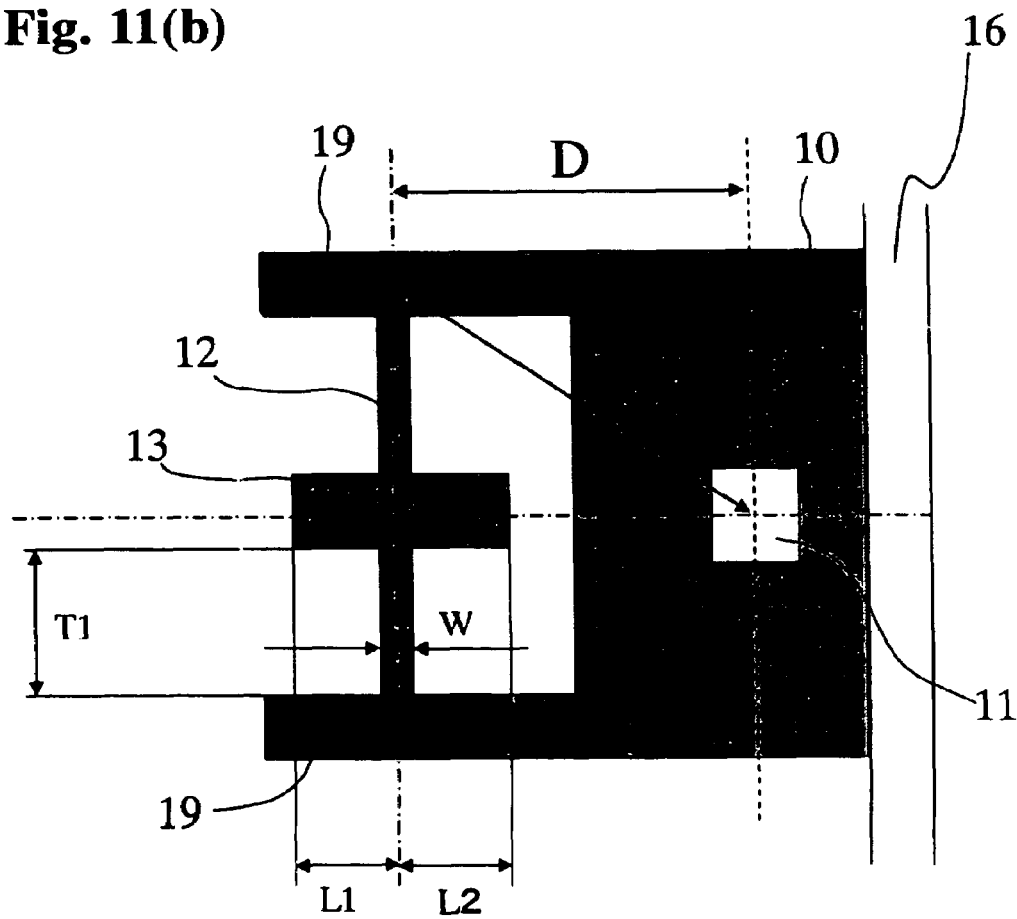

FIGS. 11(a) and 11(b) show a light-beam scanning device according to a second exemplary, non-limiting embodiment of the present invention, which comprises a base plate 10, a piezoelectric film 11, a torsion beam portion 12 and a mirror portion 13. FIGS. 11(a) and 11(b) are, respectively, a perspective view and a top plan view of the light-beam scanning device.

Except that a portion of a free end of the base plate 10 is cut out to form a pair of opposite lateral portions 19, 19 each supporting a corresponding one of opposite ends of the torsion beam portion 12, in a cantilever configuration, the light-beam scanning device illustrated in FIGS. 11(a) and 11(b) has the same structure as that in the first embodiment.

Figure 12A:
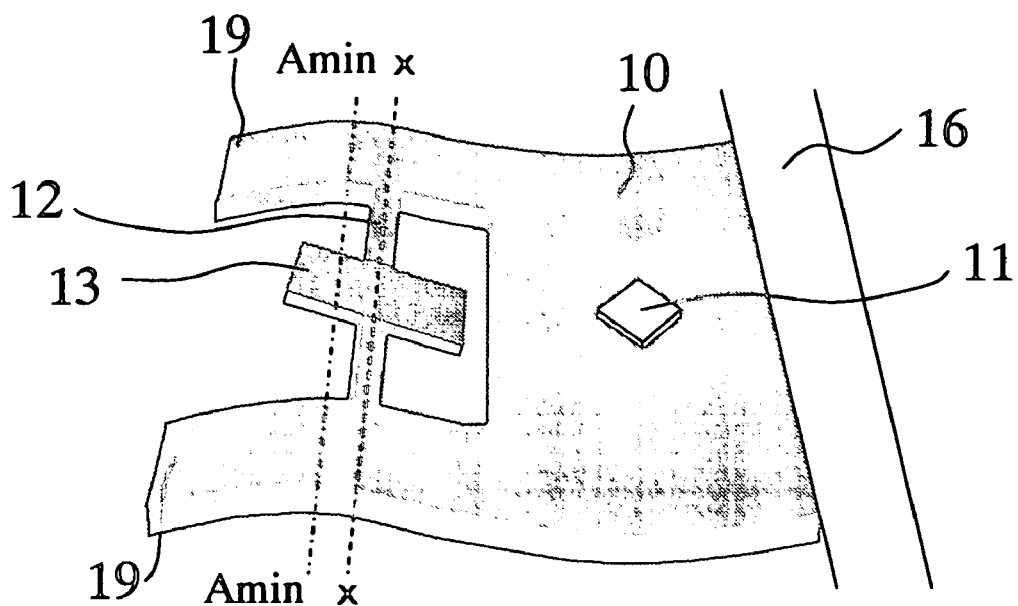
FIGS. 12(a) to 12(c) are explanatory diagrams of an operation of the light-beam scanning device according to the second embodiment, wherein a piezoelectric film is disposed in such a manner that vibrations in a base plate have a maximum amplitude at a position slightly deviated from an axis of a torsion beam portion.

As shown in FIG. 12(a), the device in FIGS. 11(a) and 11(b) is designed such that L1=L2, and form a minimum amplitude Amin of vibrations in the base plate (node of a plate wave) at a position slightly deviated from an axis X-X of the torsion beam portion 12.

Figure 12B:
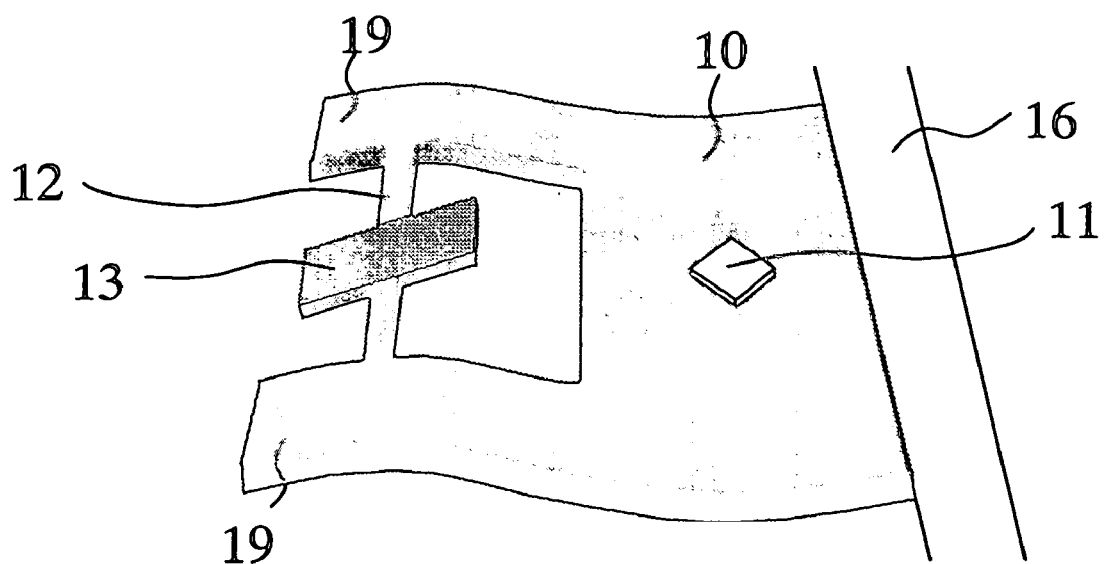
Figure 12C:
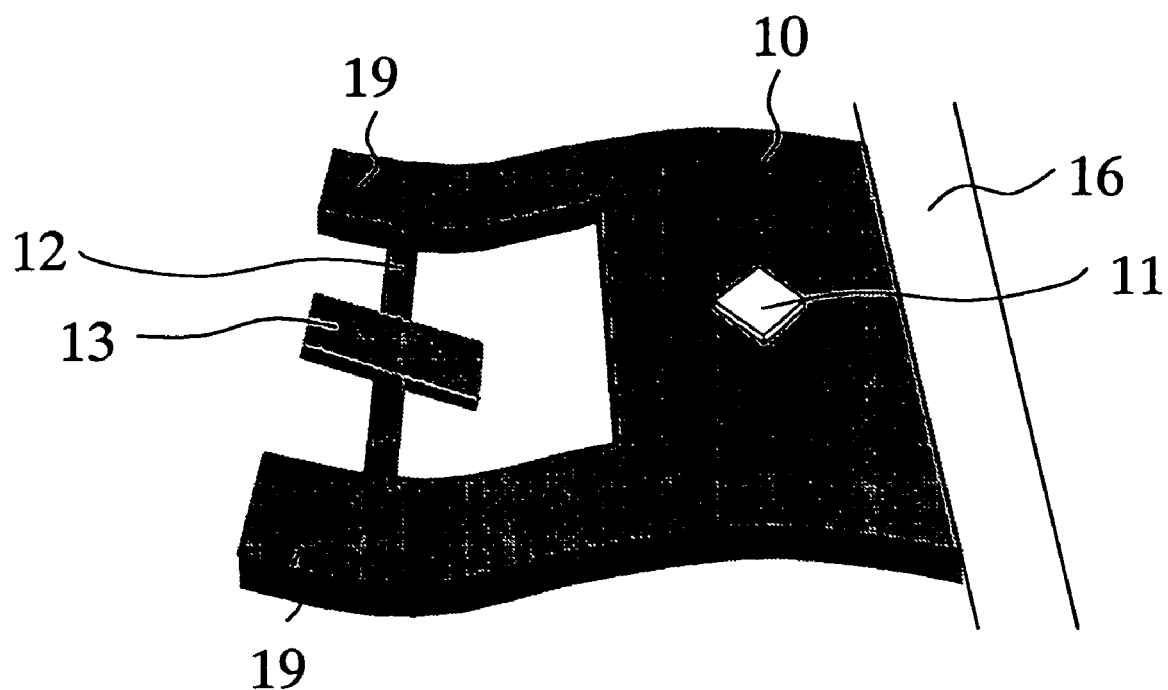

The lateral portions 19, 19 supporting the ends of the torsion beam portion 12 are formed in a cantilever configuration. Thus, the lateral portions supporting the torsion beam portion 12 can be readily deformed to effectively produce a rotational moment in the mirror section 13 as shown in FIGS. 12(b) and 12(c) so as to perform an efficient driving.

Figure 13A:
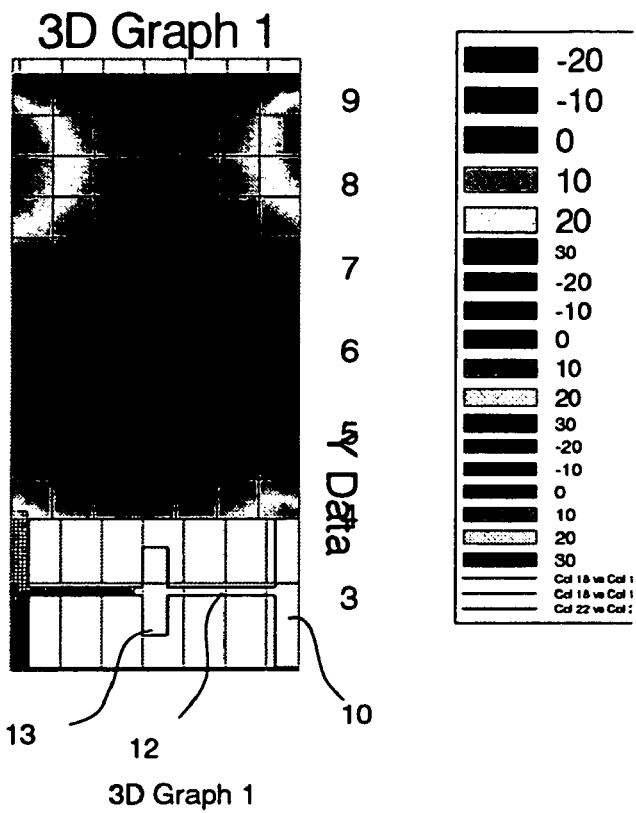
Figure 13B:
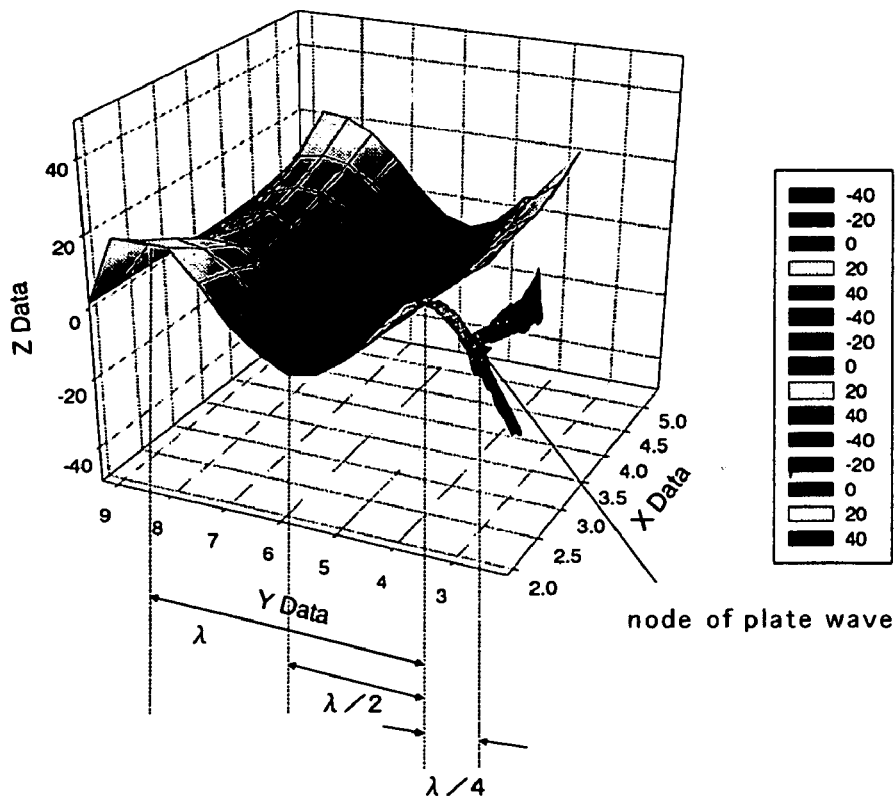
Figure 14:
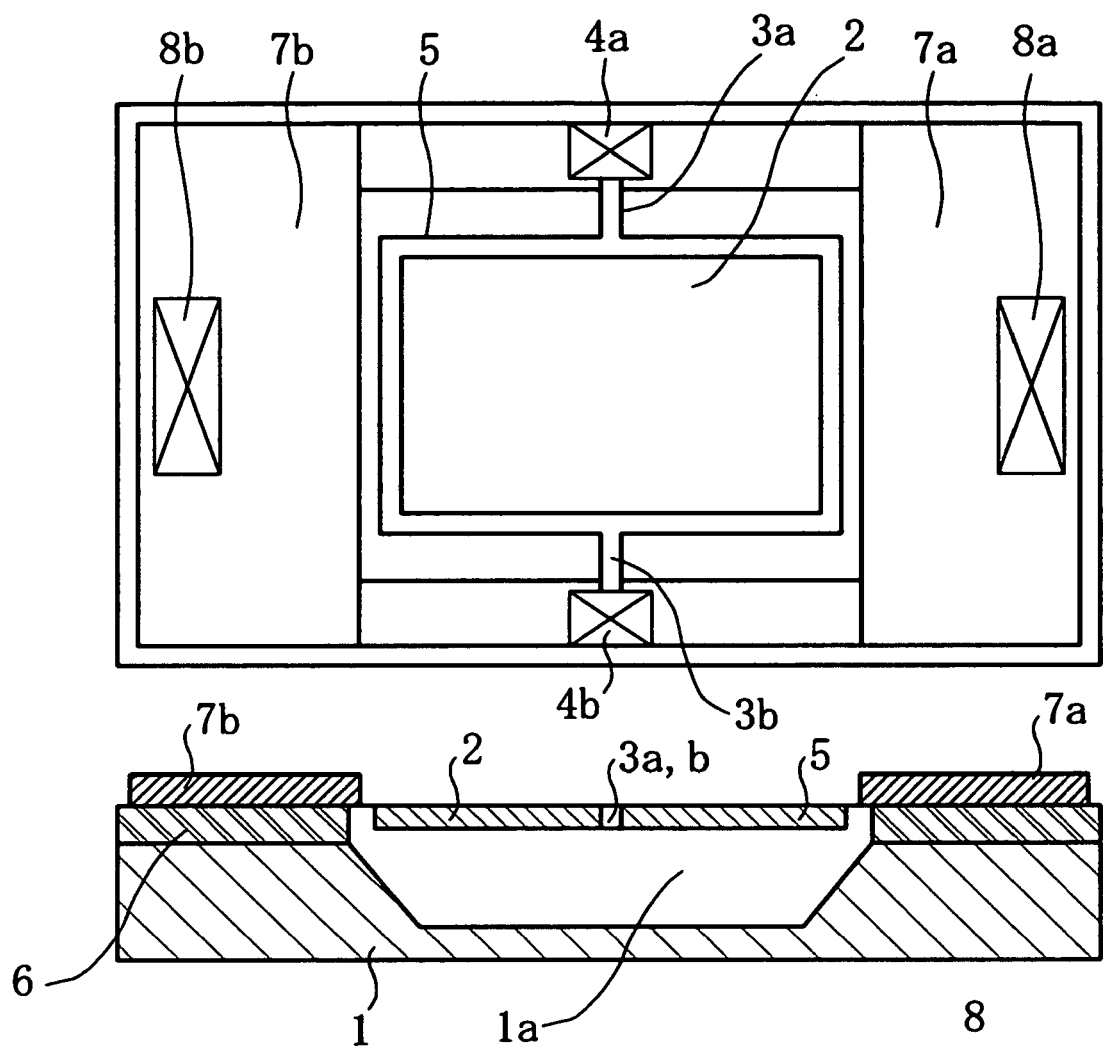
FIG. 14 shows JP '278, wherein a top plan view and a sectional front view thereof are illustrated, respectively, on the upper and lower sides of FIG. 14.
Figure 15:
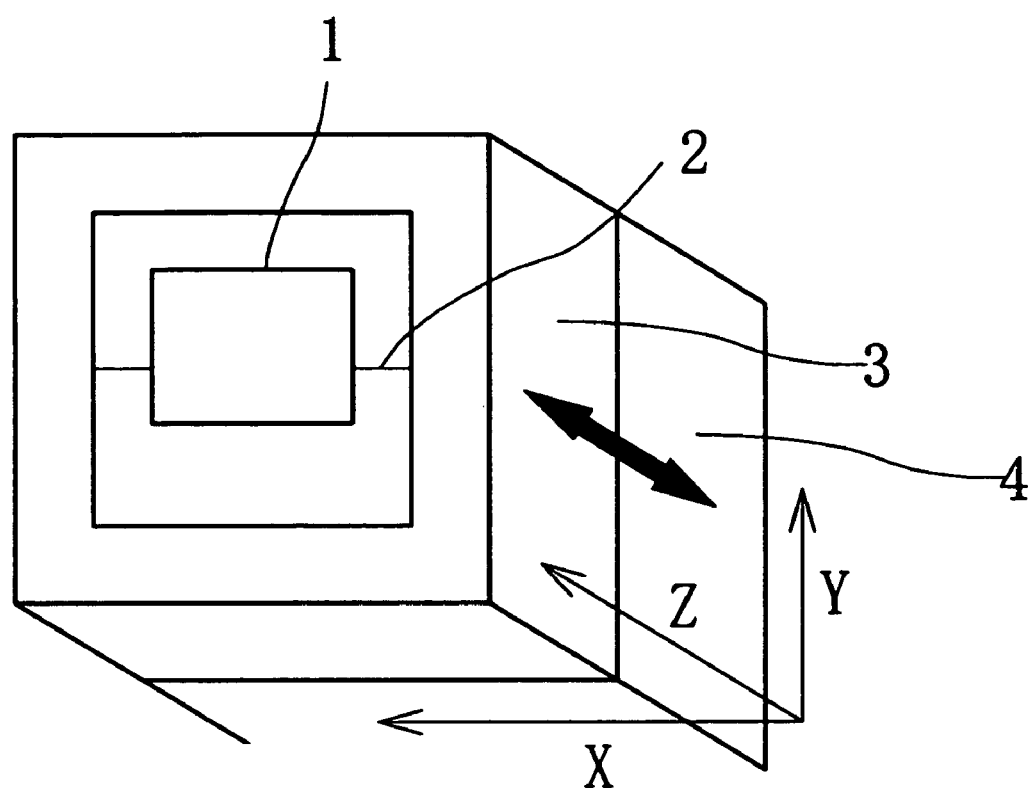
FIG. 15 is a perspective view showing JP '819.

In addition, the minimum amplitude Amin of vibrations in the base plate (node of a plate wave) is formed at a position slightly deviated from the axis X-X of the torsion beam portion 12. Thus, even if the mirror portion 13 is supported at a position corresponding to a center-of-gravity position thereof by the torsion beam portion 12, a rotational moment can be produced in the mirror portion 13 to effectively induce a torsional oscillation in the mirror portion 13. FIGS. 13(a) and 13(b) show one example of an actual test data obtained by measuring a distribution of vibrational displacements occurring on a surface of the base plate in a resonant state providing a maximized torsional oscillation, in synchronization with a driving signal applied to the piezoelectric film 11 by a laser Doppler displacement meter. Each portion of the torsion beam portion 12 connected to the base plate is located around the node of the plate wave. Thus, a vibrational displacement is minimized thereat.

It will be apparent to those skilled in the art that various modifications and variations can be made to the described illustrative, non-limiting embodiments of the present invention without departing from the spirit or scope of the invention. Thus, it is intended that the present invention cover all modifications and variations of this invention consistent with the scope of the appended claims and their equivalents.

What is claimed is:

1. A light-beam scanning device, comprising:
   a base plate having a torsion beam portion formed therein and a mirror portion supported by said torsion beam portion and adapted to be oscillated; and
   a vibration source member selected from the group consisting of a piezoelectric member, a magnetostrictive member and a permanent magnet member, said vibration source member being fixed to or formed as a portion of said base plate, wherein said mirror portion supported by said torsion beam portion is oscillated by a plate wave that is induced in said base plate by applying at least one of a voltage and an electric field to said vibration source member.

2. The light-beam scanning device as defined in claim 1, wherein said vibration source member comprises a film member formed directly on said base plate.

3. The light-beam scanning device as defined in claim 1, wherein said mirror portion has an area of at least about 200 μm squared or 200 μm$^2$, and a light-beam scanning rate of at least about 10 kHz.

4. The light-beam scanning device as defined in claim 1, wherein said base plate is configured to be partly removed while to form said torsion beam portion and said mirror portion therein.

5. The light-beam scanning device as defined in claim 1, wherein said base plate is supported in a cantilevered manner.

6. The light-beam scanning device as defined in claim 1, wherein said base plate comprises an electrically conductive material.

7. The light-beam scanning device as defined in claim 6, wherein said electrically conductive material comprises stainless steel.

8. The light-beam scanning device as defined in claim 1, wherein said base plate comprises a non-magnetic material including.

9. The light-beam scanning device as defined in claim 8, wherein said non-magnetic material comprises Si.

10. The light-beam scanning device as defined in claim 1, wherein said base plate includes a pair of opposite lateral portions each supporting a corresponding one of opposite ends of said torsion beam portion, each of said lateral portions having a cantilever configuration.

11. The light-beam scanning device as defined in claim 1, wherein said mirror portion has opposite lateral edges supported at a center-of-gravity position of said mirror portion by said torsion beam portion.

12. The light-beam scanning device as defined in claim 1, wherein said mirror portion has opposite lateral edges supported at a position deviated from a center-of-gravity position of said mirror portion by said torsion beam portion.

13. The light-beam scanning device as defined in claim 1, wherein said mirror portion has an initial twist angle relative to a horizontal position substantially parallel to a plane of said base plate.

14. The light-beam scanning device as defined in claim 1, wherein said mirror portion and said vibration source member are disposed in a common plane.

15. The light-beam scanning device as defined in claim 1, wherein said mirror portion is disposed where the plate wave induced in said base plate by said vibration source member has one of a maximum amplitude and a minimum amplitude.

16. The light-beam scanning device as defined in claim 15, wherein said vibration source member is disposed such that a distance between a center of said vibration source member and the axis of said torsion beam portion has a value derived by adding $\lambda/4$ to an integral multiple of $\lambda/2$, wherein $\lambda$ is a wavelength of the plate wave.

17. The light-beam scanning device as defined in claim 15, wherein said vibration source member is disposed such that a distance between a center of said vibration source member and the axis of said torsion beam portion has an integral multiple value of $\lambda/2$, wherein $\lambda$ is a wavelength of the plate wave.

18. The light-beam scanning device as defined in claim 1, wherein said vibration source member is disposed at a position deviated from an axis of said torsion beam portion in a direction substantially perpendicular to said axis of said torsion beam portion.

19. The light-beam scanning device as defined in claim 1, wherein said vibration source member is formed directly on said base plate through an aerosol deposition process.

20. The light-beam scanning device as defined in claim 1, wherein:
   said vibration source member has an area ranging from greater than about $(\lambda/100)^2$ to less than about $\lambda^2$, wherein $\lambda$ is a wavelength of the plate wave; and
   said piezoelectric member has a thickness ranging from about 1 to 100 μm.

* * * * *